(12) United States Patent
Shinohara

(10) Patent No.: US 9,030,640 B2
(45) Date of Patent: May 12, 2015

(54) ELECTRO-OPTICAL DEVICE AND ELECTRONIC APPARATUS

(71) Applicant: Seiko Epson Corporation, Tokyo (JP)

(72) Inventor: Takashi Shinohara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 14/159,695

(22) Filed: Jan. 21, 2014

(65) Prior Publication Data

US 2014/0211144 A1 Jul. 31, 2014

(30) Foreign Application Priority Data

Jan. 29, 2013 (JP) ................................. 2013-014037

(51) Int. Cl.
*G02F 1/1339* (2006.01)
(52) U.S. Cl.
CPC .................................... *G02F 1/1339* (2013.01)
(58) Field of Classification Search
None
See application file for complete search history.

(56) References Cited

U.S. PATENT DOCUMENTS

2004/0061920 A1\* 4/2004 Tonar et al. ................... 359/265

FOREIGN PATENT DOCUMENTS

| JP | 06-123882 A | 5/1994 |
|----|-------------|--------|
| JP | 09-185998 A | 7/1997 |
| JP | 2009-080396 A | 4/2009 |
| JP | 2009-163082 A | 7/2009 |
| JP | 2010-026307 A | 2/2010 |

\* cited by examiner

*Primary Examiner* — Lucy Chien
(74) *Attorney, Agent, or Firm* — ALG Intellectual Property, LLC

(57) ABSTRACT

In an electro-optical device, an electro-optical material is doubly sealed with a first seal member and a second seal member. In the second seal member, first particles are located in a gap between a first substrate and a second substrate, and second particles are located outside of the gap between the first substrate and the second substrate, so as to cover the opening of the gap.

6 Claims, 5 Drawing Sheets

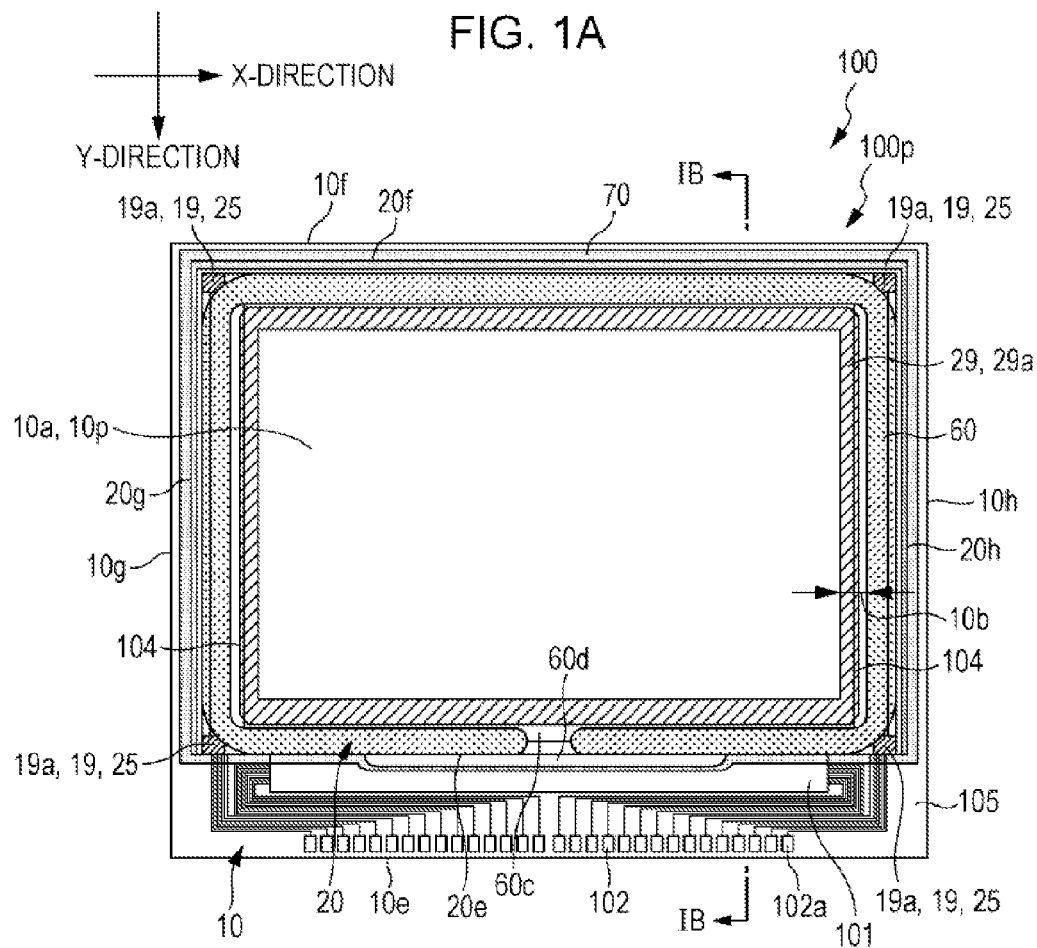
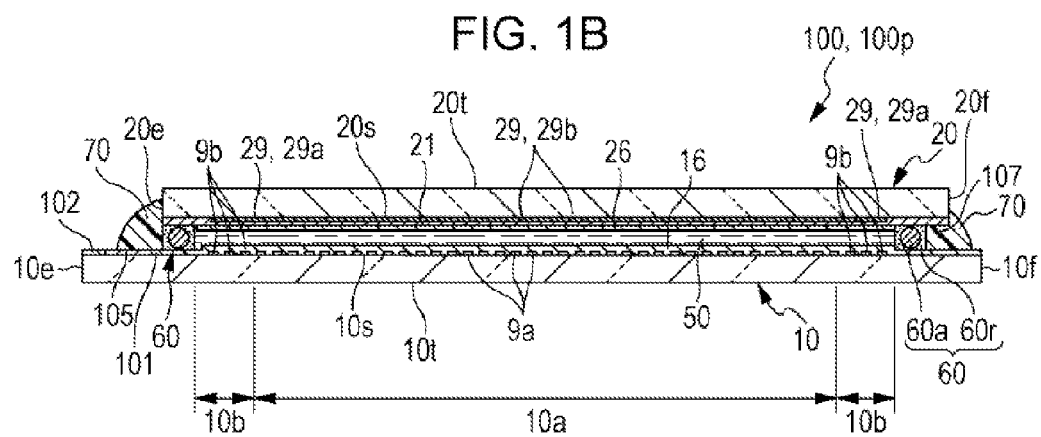

ELECTRO-OPTICAL DEVICE AND ELECTRONIC APPARATUS

BACKGROUND

1. Technical Field

The present invention relates to an electro-optical device including an electro-optical material interposed between a first substrate and a second substrate, and an electronic apparatus incorporated with such an electro-optical device.

2. Related Art

Electro-optical devices such as a liquid crystal device generally include a first substrate and a second substrate opposed to each other and bonded together via a seal member, and an electro-optical material including a liquid crystal material located in a space surrounded by the seal member between the first substrate and the second substrate. In case that moisture intrudes from outside into the electro-optical device through the seal member, the electro-optical material is prone to be degraded. Accordingly, for example JP-A-2009-163082, JP-A-2010-26307, JP-A-6-123882, and JP-A-2009-80396 propose providing a second seal member formed of a resin-based material or a rubber-based material, around the outer periphery of the first seal member. More specifically, JP-A-2009-163082 and JP-A-2010-26307 propose forming an encapsulating layer composed of an inorganic material on the surface of the second seal member, and JP-A-6-123882 and JP-A-2009-80396 propose employing a second seal member containing, dispersed therein, a desiccant such as silica gel micropowder, or particles of porous silicon oxide.

In the electro-optical devices according to JP-A-2009-163082 and JP-A-2010-26307, however, a special composition is not adopted for the second seal member, unlike in JP-A-6-123882 and JP-A-2009-80396. Therefore, once moisture from outside permeates through the encapsulating layer formed of an inorganic material, the moisture reaches the internal area through the second seal member and the first seal member. Further, in the electro-optical devices according to JP-A-6-123882 and JPA-2009-80396, when the silica gel micropowder or the porous silicon oxide is saturated with moisture, the hygroscopic effect is no longer expected. Furthermore, in the case of employing a filler as additive to the seal member as disclosed in JP-A-6-123882 and JP-A-2009-80396, the seal member has to contain a certain ratio of the filler in order to obtain the desired effect, which leads to an increase in viscosity of the seal member thus making it difficult to properly apply the seal member. Consequently, it is difficult to effectively prevent the degradation of the electro-optical material due to the intrusion of moisture, with the configuration according to JP-A-2009-163082, JP-A-2010-26307, JP-A-6-123882, and JP-A-2009-80396.

SUMMARY

An advantage of some aspects of the invention is provision of an electro-optical device that includes a seal member having an improved composition and capable of effectively preventing intrusion of moisture from outside, and an electronic apparatus that includes such an electro-optical device.

In an aspect, the invention provides an electro-optical device including a first substrate, a second substrate opposed to the first substrate, an electro-optical material retained between the first substrate and the second substrate, a first seal member combining the first substrate and the second substrate together and sealing the electro-optical material, and a second seal member formed along an outer periphery of the first seal member and containing a plurality of first particles and a plurality of second particles larger in diameter than the first particles. The first particles are located between the first substrate and the second substrate, and the second particles are located on an outer side of the region where the first particles are located.

In the mentioned electro-optical device, the second seal member is provided along the periphery of the first seal member combining the first substrate and the second substrate, and the second seal member contains the particles (first particles and second particles). Accordingly, moisture is prevented from permeating through the second seal member because the particles contained therein serve to increase the migration distance of moisture. In addition, the plurality of first particles in the second seal member are located in the gap between the first substrate and the second substrate, and therefore the first particles effectively prevent permeation of moisture through the gap between the first substrate and the second substrate. Further, the plurality of second particles in the second seal member are located on the outer side of the gap between the first substrate and the second substrate, and therefore the second particles effectively prevent permeation of moisture through the outer region of the gap. Accordingly, the electro-optical device thus configured effectively prevents intrusion of moisture from outside with the second seal member, to thereby suppress degradation of the electro-optical material due to moisture.

Preferably, the foregoing electro-optical device may further include an inorganic layer covering an exposed surface of the second seal member. Such a configuration suppresses intrusion of moisture into the second seal member with the inorganic layer.

In the foregoing electro-optical device, preferably, a side face of the second substrate may be located on an inner side of a side face of the first substrate in a plan view, the second substrate may include a sloped surface formed between the side face of the second substrate and a face of the second substrate opposing the first substrate, the sloped surface being inclined with respect to a face of the first substrate opposing the second substrate, and at least a part of at least one of the plurality of second particles may be located between the sloped surface and the face of the first substrate opposing the second substrate, at a position overlapping the sloped surface in a plan view. Such a configuration effectively suppresses intrusion of moisture into the gap between the first substrate and the second substrate, with the second particle.

In the foregoing electro-optical device, preferably, the first seal member may include a spacer that defines the clearance between the first substrate and the second substrate, and the first particles may be smaller in diameter than the spacer.

In the foregoing electro-optical device, preferably, a mass percentage of the first particles in the second seal member may be larger than a mass percentage of the second particles in the second seal member.

The foregoing electro-optical device may be incorporated in electronic apparatuses such as a mobile phone, a mobile computer, and a projection display device. Among those, in particular, the projection display device may include a light source unit that supplies light to the electro-optical device, and a projection optical system that projects the light optically modulated by the electro-optical device.

BRIEF DESCRIPTION OF THE DRAWINGS

The invention will be described with reference to the accompanying drawings, wherein like numbers reference like elements.

FIG. 1A is a plan view showing a liquid crystal panel of an electro-optical device according to a first embodiment of the invention, and FIG. 1B is a cross-sectional view taken along a line IB-IB in FIG. 1A.

DESCRIPTION OF EXEMPLARY EMBODIMENTS

Figure 2:
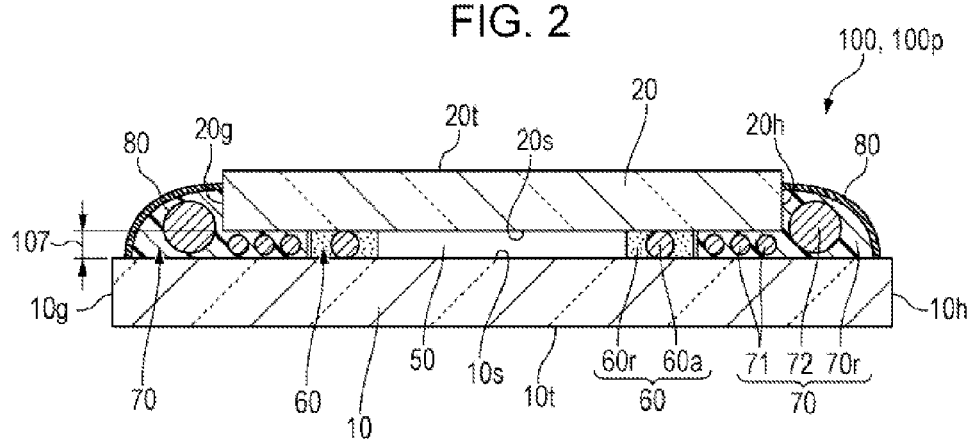
FIG. 2 is a schematic cross-sectional view of a second seal member provided in the electro-optical device according to the first embodiment.

Hereafter, a liquid crystal device, typically exemplifying the electro-optical device according to the invention, will be described referring to the drawings. In the drawings, components and layers may be shown in different scales, for better visual recognition.

First Embodiment

General Configuration

FIGS. 1A and 1B illustrate a liquid crystal panel of the electro-optical device according to a first embodiment of the invention. FIG. 1A is a plan view of the liquid crystal panel and components thereof seen from the side of a counter substrate, and FIG. 1B is a cross-sectional view taken along a line IB-IB in FIG. 1A.

The electro-optical device 100 shown in FIGS. 1A and 1B is a liquid crystal device, and includes a liquid crystal panel 100p. The liquid crystal panel 100p includes a first substrate 10 (element substrate) and a second substrate 20 (counter substrate) bonded together with a predetermined gap therebetween by a first seal member 60. The first seal member 60 is provided in a frame shape along the outer periphery of the second substrate 20. The first seal member 60 contains an adhesive 60r composed of a photocuring resin, a thermosetting resin, or the like, and a spacer 60a formed of glass fiber or glass beads dispersed in the first seal member 60, for setting the distance between the first and the second substrate to a predetermined value.

The liquid crystal panel 100p includes an electro-optical material layer 50 composed of a liquid crystal material and so forth, in a region between the first substrate 10 and the second substrate 20 and surrounded by the first seal member 60, the first seal member 60 serving as the adhesive bonding the first substrate 10 and the second substrate 20 together and sealing the electro-optical material 50. In this embodiment, the first seal member 60 includes a disconnected portion serving as a liquid crystal inlet 60c, which is sealed with a seal member 60d after the liquid crystal material is introduced. The electro-optical device 100 according to this embodiment also includes a second seal member 70 provided around the periphery of the first seal member 60. The configuration of the second seal member 70 will be subsequently described referring to FIG. 2.

In the liquid crystal panel 100p configured as above, the first substrate 10 and the second substrate 20 are both of a rectangular shape. Accordingly, the first substrate 10 includes two side faces 10e, 10f opposing each other in a Y-direction and two side faces 10g, 10h opposing each other in an X-direction. Likewise, the second substrate 20 includes two side faces 20e, 20f opposing each other in the Y-direction and two side faces 20g, 20h opposing each other in the X-direction. An image display region 10a of a rectangular shape is provided in a generally central portion of the liquid crystal panel 100p, and therefore the first seal member 60 is also formed in a generally rectangular shape.

In the electro-optical device 100 according to this embodiment, the second substrate 20 is smaller in dimensions than the first substrate 20 in a plan view. Therefore, the four side faces 20e, 20f, 20g, 20h of the second substrate 20 are respectively located on an inner side of the four side faces 10e, 10f, 10g, 10h of the first substrate 10, in a plan view. In addition, the distance between the side face 10e of the first substrate 10 and the side face 20e of the second substrate 20 is larger than the distance between the other sides faces of the first substrate 10 and those of the second substrate 20, and hence the first substrate 10 includes a bulging portion 105 protruding from the side face 20e of the second substrate 20 by a larger area than the other side faces.

On the first substrate 10, a data line driver circuit 101 and a plurality of terminals 102 are provided in a region on the outer side of the image display region 10a and along the side face 10e which is one of the two sides opposing in the Y-direction, and scanning line driver circuits 104 are provided along the side faces 10g, 10h adjacent to the side face 10e. A flexible wiring substrate (not shown) is connected to the terminals 102, so that potentials and signals are inputted to the first substrate 10 from an external control circuit through the flexible wiring substrate. The first substrate 10 has a first surface 10s opposing the second substrate 20, and a second surface 10t. Pixel electrodes 9a and pixel transistors (not shown) are arranged in a matrix pattern in the image display region 10a, on the first surface 10s. Accordingly, the image display region 10a may also be referred to as a pixel electrode matrix region in which the pixel electrodes 9a are arranged in the matrix pattern. In addition, an alignment layer 16 is provided over the pixel electrodes 9a, on the first substrate 10 configured as above.

In the region on the first surface 10s of the first substrate 10 on the outer side of the image display region 10a, dummy pixel electrodes 9b formed together with the pixel electrodes 9a are provided in a peripheral region 10b of a frame shape between the image display region 10a and the first seal member 60. The dummy pixel electrodes 9b receive a common potential Vcom to suppress irregular alignment of liquid crystal molecules on the peripheral edge of the image display region 10a. The dummy pixel electrodes 9b also serve to reduce a difference in height between the image display region 10a and the peripheral region 10b in a polishing process of the first substrate 10 for planarizing the surface on which the alignment layer 16 is to be formed, thereby improving the planarization effect. There are cases where the potential is not applied to the dummy pixel electrodes 9b so as to leave the dummy pixel electrodes 9b potentially floating, however in such cases also the dummy pixel electrodes 9b reduce the difference in height between the image display region 10a and the peripheral region 10b, thereby improving the planarization effect of the surface on which the alignment layer 16 is to be formed.

The second substrate 20 has a first surface 20s opposing the first substrate 10, and a second surface 20t, and a common electrode 21 is provided on the first surface 20s. The common electrode 21 is provided generally over the entirety of the second substrate 20. On the first surface 20s of the second substrate 20, a light shield layer 29 is provided under the common electrode 21, and an alignment layer 26 is stacked on the surface of the common electrode 21. The light shield layer 29 constitutes a frame-shaped portion 29a extending along the outer periphery of the image display region 10a, and the inner periphery of the light shield layer 29 defines the image display region 10a. The light shield layer 29 also includes black matrix portions 29b respectively corresponding to regions between the pixel electrodes 9a adjacent to each other. The frame-shaped portion 29a is located so as to overlap the dummy pixel electrodes 9b, and the outer periphery of the frame-shaped portion 29a is spaced from the inner periphery of the first seal member 60 by a certain distance. Therefore, the frame-shaped portion 29a does not overlap the first seal member 60.

In the region in the liquid crystal panel 100p on the outer side of the first seal member 60, inter-substrate conduction electrodes 25 are provided on the first surface 20s of the second substrate 20, at positions respectively corresponding to the four corners of the second substrate 20, and inter-substrate conduction electrodes 19 are provided on the first surface 10s of the first substrate 10, at positions respectively corresponding to the four corners of the second substrate 20, i.e., the inter-substrate conduction electrode 25. In this embodiment, the inter-substrate conduction electrodes 25 constitute a part of the common electrode 21. The inter-substrate conduction electrodes 19 receive the common potential Vcom. An inter-substrate conductor 19a containing conductive particles is provided between each pair of the inter-substrate conduction electrode 19 and the inter-substrate conduction electrode 25, and the common electrode 21 of the second substrate 20 is electrically connected to the first substrate 10 via the inter-substrate conduction electrode 19, the inter-substrate conductor 19a and the inter-substrate conduction electrode 25. Accordingly, the common electrode 21 receives the common potential Vcom from the side of the first substrate 10. The first seal member 60 extends along the outer periphery of the second substrate 20 in a generally constant width, so as to pass along the inner side of the inter-substrate conduction electrodes 19, 25 (on the side of the image display region 10a) at the positions corresponding to the corners of the second substrate 20.

In this embodiment, the electro-optical device 100 is a transmissive liquid crystal device, and the pixel electrode 9a and the common electrode 21 are formed of a light-transmissive conductive layer such as an indium tin oxide (ITO) layer or an indium zinc oxide (IZO) layer. In such a transmissive liquid crystal device (electro-optical device 100), for example, light incident from the second substrate 20 is modulated while being outputted from the first substrate 10. In the case where the electro-optical device 100 is a reflective liquid crystal device, the common electrode 21 is formed of a light-transmissive conductive layer such as an ITO layer or an IZO layer, and the pixel electrode 9a is formed of a reflective conductive layer such as an aluminum layer. In such a reflective liquid crystal device (electro-optical device 100), light incident from the second substrate 20 is modulated while being reflected by the first substrate 10 and outputted therefrom.

The electro-optical device 100 may be employed as a color display device for electronic apparatuses such as a mobile phone and a mobile computer, in which case a color filter (not shown) is provided in the second substrate 20. The electro-optical device 100 may also be realized as an electronic paper.

Further, in the electro-optical device 100 a polarizing film, a phase difference film, a polarizing plate and so forth are employed, in predetermined orientations with respect to the liquid crystal panel 100p depending on the type of the electro-optical material 50 (liquid crystal) and whether the mode is normally white or normally black. Still further, the electro-optical device 100 may be employed as a light bulb for each of the RGB colors in a projection display device (liquid crystal projector) to be subsequently described. In this case, the color filter is not provided because the light of each of the RGB colors, separated by a dichroic mirror for RGB separation, is incident onto the electro-optical device 100 for the corresponding color, as projection light.

Configuration of Second Seal Member 70

FIG. 2 is a schematic cross-sectional view of the second seal member 70 in the electro-optical device 100 according to this embodiment.

As shown in FIGS. 1A, 1B and 2, in the electro-optical device 100 according to this embodiment the first seal member 60 serves to bond the first substrate 10 and the second substrate 20 together and to seal the electro-optical material 50. In addition, the second seal member 70 is provided around the entire periphery of the first seal member 60, and a portion of the first seal member 60 exposed toward the outer side is covered with the second seal member 70. Thus, the electro-optical material 50 is doubly sealed by the first seal member 60 and the second seal member 70 and hence moisture is prevented from intruding into the internal region of the first seal member 60. Therefore, degradation of the electro-optical material 50 due to moisture can be prevented.

In this embodiment, further, an insulative inorganic layer 80 formed of silicon oxide such as SiO or $SiO_2$, silicon nitride, silicon oxynitride, silicon nitroxide, aluminum oxide, or tantalum oxide is provided over the surface of the second seal member 70, as an inorganic encapsulating layer. The inorganic layer 80 has a thickness of, for example, 1 to 5 μm. The inorganic layer 80 may be a monolayer or a multilayer including the inorganic layers cited above.

In this embodiment, the second substrate 20 is smaller in dimensions than the first substrate 20, and the four side faces 20e, 20f, 20g, 20h of the second substrate 20 are respectively located on the inner side of the four side face 10e, 10f, 10g, 10h of the first substrate 10, in a plan view. Accordingly, the second seal member 70 is formed so as to span over the side faces 20e, 20f, 20g, 20h of the second substrate 20 and the first surface 10s of the first substrate 10 opposing the second substrate 20. In other words, the second seal member 70 is formed on the outer side of the seal member 60, from halfway of the side faces 20e, 20f, 20g, 20h of the second substrate 20 to the first surface 10s of the first substrate 10 opposing the second substrate 20, via the outer side face of the first seal member 60.

Further, in this embodiment the portion of the first seal member 60 extending along the side faces 20f, 20g, 20h, out of the side faces 20e, 20f, 20g, 20h of the second substrate 20, is located on the inner side of the side faces 20f, 20g, 20h. Accordingly, the second seal member 70 is formed so as to fill in a gap 107 defined between the first substrate 10 and the second substrate 20 on the outer side of the first seal member 60, along the side faces 20f, 20g, 20h of the second substrate 20. Here, the outer periphery of the first seal member 60 is located so as to overlap the side face 20e of the second substrate 20 or on a slightly inner side from the side face 20e in a plan view, because the liquid crystal inlet 60c has to be formed at a position along the side face 20e of the second substrate 20. In the case where the outer periphery of the first seal member 60 is located on the inner side from the side face 20e in a plan view, the gap 107 is also formed between the first substrate 10 and the second substrate 20 along the side face 20e, and hence the second seal member 70 is formed so as to fill in the gap 107 between the first substrate 10 and the second substrate 20. In contrast, in the case where the outer periphery of the first seal member 60 is located so as to overlap the side face 20e in a plan view, the gap 107 between the first substrate 10 and the second substrate 20 is not formed along the side face 20e, and therefore the second seal member 70 is formed only in the region between the side face 20e and the side face 10e in a plan view. In addition, since the seal member 60d is provided along the side face 20e, the second seal member 70 is formed so as to also cover the seal member 60d in the region where the seal member 60s is provided.

As shown in FIG. 2, the second seal member 70 contains a plurality of first particles 71 and a plurality of second particles 72 different in diameter from the first particles 71, dispersed in a resin 70r. In this embodiment, the diameter of the first particle 71 is smaller than the height of the gap 107 between the first substrate 10 and the second substrate 20, and hence a part of the first particles 71 is located in the region in the gap 107 between the first substrate 10 and the second substrate 20 on the outer side of the first seal member 60. The distance between the first substrate 10 and the second substrate 20 is defined by the spacer 60a contained in the first seal member 60 in this embodiment, and the first particles 71 are smaller in diameter than the spacer 60a. For example, the height of the gap 107 between the first substrate 10 and the second substrate 20 and the diameter of the spacer 60a may be 3.0 µm, and the diameter of the first particle 71 may be not smaller than 1.5 µm but smaller than 3.0 µm.

On the other hand, the second particles 72 are larger in diameter than the first particles 71 and the spacer 60a. The diameter of the second particle 72 may be, for example, larger than 3.0 µm but not larger than 50 µm. Therefore, the second particles 72 are located on the outer side of the gap 107 between the first substrate 10 and the second substrate 20, so as to close the gap 107. In other words, the center of the second particle 72 is located on the outer side of the edge of the second substrate 20 in a plan view.

The first particles 71 and the second particles 72 may be, for example, formed of silicon oxide, a plastic, or the like. Although the first particles 71 and the second particles 72 may be formed of different materials, it is preferable to employ the same material. The first particles 71 and the second particles 72 may be any of conductive particles, insulative particles, and conductive particles coated with an insulative material. It is preferable that the first particles 71 and the second particles 72 have generally the same thermal expansion rate as the resin 70r. It is preferable to employ a thermosetting resin such as an epoxy resin or an acrylic resin, or a resin that naturally solidifies such as an anaerobic resin to form the resin 70r, as in the case of the adhesive 60r of the first seal member 60. A UV-curing resin may be employed as the resin 70r, however in this case UV ray has to be selectively emitted onto the second seal member 70 because the electro-optical material 50 may be degraded if the liquid crystal panel 100p is irradiated with the UV ray.

In this embodiment, the mass percentage of the first particles 71 in the second seal member 70 is higher than that of the second particles 72 in the second seal member 70. The content of the first particles 71 with respect to the resin 70r may be, for example, 15 to 50 wt %, and preferably 30 wt % at maximum. A preferable content of the second particles 72 with respect to the resin 70r is 5 to 10 wt %.

Manufacturing Method of Electro-Optical Device 100

In the manufacturing process of the electro-optical device 100 according to this embodiment, the second seal member 70 may be formed as described hereunder.

First, a liquid crystal panel cut in a size that fits an electronic apparatus on which the electro-optical device 100 is to be mounted (electro-optical device 100 (liquid crystal panel 100p) not yet including the second seal member 70) is prepared. Then the second seal member 70 is applied by using a dispenser onto the side faces 20e, 20f, 20g, 20h of the second substrate 20 from an oblique or orthogonal direction, and the second seal member 70 is cured. In this process, utilizing a plurality of dispensers to respectively apply the second seal member 70 to the side faces 20e, 20f, 20g, 20h of the second substrate 20 improves the application efficiency of the second seal member 70.

Alternatively, the application and curing of the second seal member 70 may be performed after the seal member 60d is formed to cover the liquid crystal inlet 60c, and then the large-sized substrate may be cut into a predetermined size. To be more detailed, a large-sized substrate on which a plurality of first substrates 10 are provided and another large-sized substrate on which a plurality of second substrates 20 respectively corresponding to the plurality of first substrates 10 are provided may be first bonded together with the first seal member 60 including the disconnected portion. Then the sealing process may be performed in which the electro-optical material 50 is injected through the liquid crystal inlet 60c and the disconnected portion is covered with the seal member 60d, after which the second seal member 70 may be applied and cured. Then the large-sized substrates may be cut after the foregoing process.

In the manufacturing process of the electro-optical device 100 according to this embodiment, the inorganic layer 80 may be formed by performing mask deposition or mask sputtering on the panel on which the second seal member 70 has been formed (electro-optical device 100 (liquid crystal panel 100p) not yet including the inorganic layer 80), on the region where the surface of the second seal member 70 is exposed. In this process, a plurality of panels may be stacked, and the mask deposition or mask sputtering may be performed on the exposed surface of the second seal member 70, to thereby selectively form the inorganic layer 80.

Advantageous Effects

As described above, the electro-optical material 50 in the electro-optical device 100 according to this embodiment is doubly sealed with the first seal member 60 and second seal member 70, and therefore intrusion of moisture from outside into the internal region of the first seal member 60 can be prevented.

In addition, the second seal member 70 contains the first particles 71 and the second particles 72. Here, the first particles 71 and the second particles 72 are formed of silicon oxide, a plastic, or the like. The silicon oxide and plastics are less transmissive of moisture than the resin 70r, and therefore the presence of the first particles 71 and the second particles 72 in the second seal member 70 increases the length of the migration of moisture, thus more effectively suppressing moisture from permeating through the second seal member 70.

The plurality of first particles 71 in the second seal member 70 are located in the gap 107 between the first substrate 10 and the second substrate 20, and thus effectively prevent permeation of moisture through the gap 107 between the first substrate 10 and the second substrate 20. Likewise, the plurality of second particles 72 in the second seal member 70 are located outside of the gap 107 between the first substrate 10 and the second substrate 20, and thus effectively prevent permeation of moisture through the region outside of the gap 107. Moreover, the first particles 71 intrude into the gap 107 when the second seal member 70 intrudes into the gap 107 by a capillary effect upon being applied, however the second particles 72 are blocked at the entrance of the gap 107 and thus remain at the position to close the gap 107. Accordingly, the second particles 72 serve to prevent moisture from intruding into the gap 107 between the first substrate 10 and the second substrate 20, and the first particles 71 serve to suppress the moisture that has intruded into the gap 107, if any, from proceeding further. Thus, the configuration according to this embodiment effectively prevents the intrusion of moisture from outside with the second seal member 70, thereby suppressing degradation of the electro-optical material 50 due to moisture. Further, since the second seal member 70 contains the first particles 71 and the second particles 71 which are different in diameter, there is no need to excessively increase the content of the particles. Therefore, the viscosity of the second seal member 70 before the curing process can be suppressed to a relatively low level, which facilitates the application of the second seal member 70.

Further, in this embodiment the mass percentage of the first particles 71 in the second seal member 70 is higher than that of the second particles 72 in the second seal member 70. The content of the first particles 71 with respect to the resin 70r may be, for example, 15 to 50 wt %, and preferably 30 wt % at maximum. An excessively high content of the first particles 71 leads to an increase in viscosity of the second seal member 70, thus making it difficult for the second seal member 70 to intrude into the gap 107, while an excessively low content of the first particles 71 cancels the expected advantageous effect. In contrast, it suffices that the content of the second particles 72 is 5 to 10 wt % with respect to the resin 70r, because the second particles 72 are only expected to cover the whole or a part of the gap 107.

In this embodiment, still further, the surface of the second seal member 70 is covered with the inorganic layer 80, which serves to prevent the intrusion of moisture into the second seal member 70. Such a configuration further assures the prevention of degradation of the electro-optical material 50 due to moisture.

Second Embodiment

Figure 3:
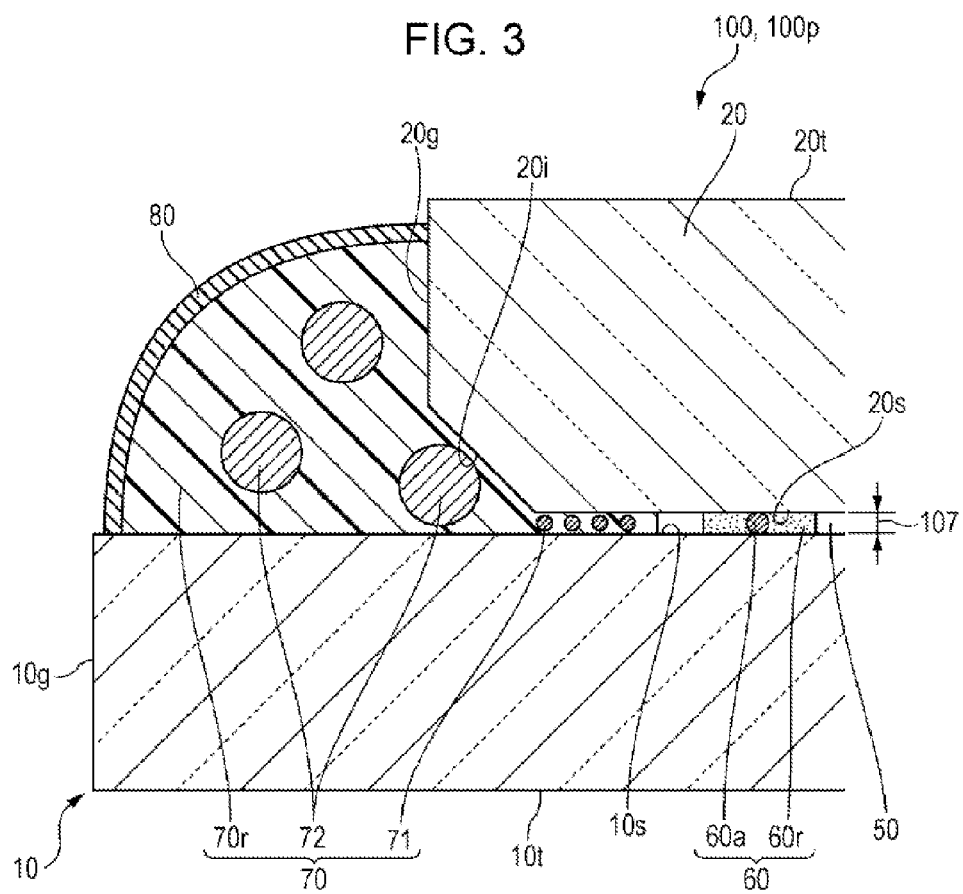
FIG. 3 is a schematic cross-sectional view of a second seal member provided in an electro-optical device according to a second embodiment of the invention.

FIG. 3 is a schematic cross-sectional view of the second seal member 70 provided in the electro-optical device 100 according to a second embodiment of the invention. The basic configuration of this embodiment is generally the same as that of the first embodiment, and therefore the same constituents will be given the same numeral and the description thereof will not be repeated. The following description will focus on a region in the vicinity of the side face 20g of the second substrate 20.

As shown in FIG. 3, in the electro-optical device 100 according to this embodiment the first seal member 60 serves to bond the first substrate 10 and the second substrate 20 together and to seal the electro-optical material 50, as in the first embodiment. In addition, the second seal member 70 is provided around the entire periphery of the first seal member 60, so as to cover the outer face of the first seal member 60. In this embodiment, further, the insulative inorganic layer 80 formed of silicon oxide such as SiO or $SiO_2$, silicon nitride, silicon oxynitride, silicon nitroxide, aluminum oxide, or tantalum oxide, is provided over the surface of the second seal member 70. In addition, the second substrate 20 is smaller in dimensions than the first substrate 20, and therefore the side faces 20g of the second substrate 20 is located on the inner side of the side face 10g of the first substrate 10, in a plan view.

Here, the second substrate 20 includes a sloped surface 20i formed between the side face 20g of the second substrate 20 and the first surface 20s of the second substrate 20 opposing the first substrate 10, the sloped surface 20i being inclined with respect to the first surface 20s. The sloped surface 20i is also provided in each of the remaining side faces of the second substrate 20, between the side face and the first surface 20s. Accordingly, at least a part of at least one of the plurality of second particles 72 contained in the second seal member 70 is located between the sloped surface 20i and the first surface 10s of the first substrate 10 opposing the second substrate 20, so as to overlap the sloped surface 20i in a plan view. Therefore, the second particles 72 are blocked at the position between the sloped surface 20i of the second substrate 20 and the first surface 10s of the first substrate 10, and thus remain at the position to close the gap 107, when the second seal member 70 intrudes into the gap 107 by a capillary effect upon being applied. Thus, the second particles 72 serve to prevent intrusion of moisture into the gap 107 between the first substrate 10 and the second substrate 20, thereby effectively preventing intrusion of moisture into the internal region of the first seal member 60.

Third Embodiment

Figure 4:
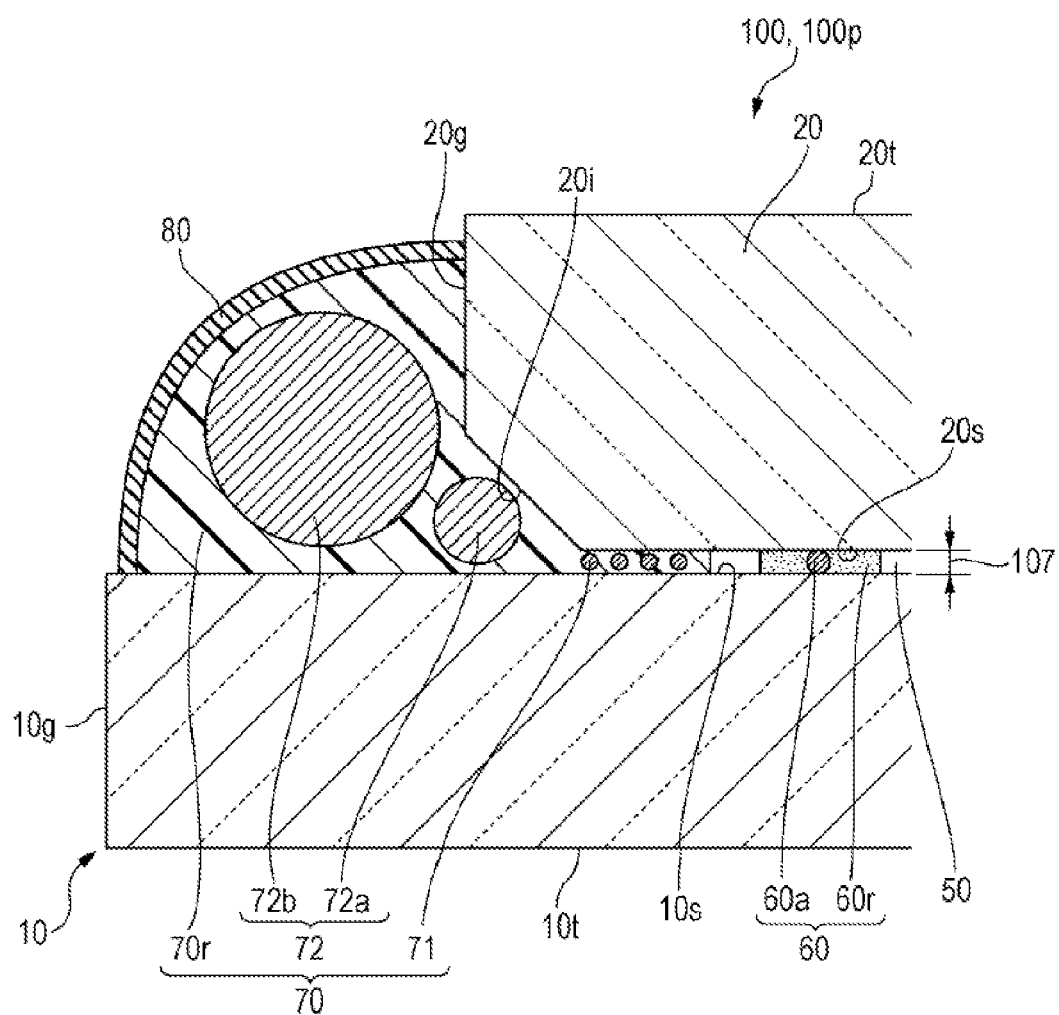
FIG. 4 is a schematic cross-sectional view of a second seal member provided in an electro-optical device according to a third embodiment of the invention.

FIG. 4 is a schematic cross-sectional view of the second seal member 70 provided in the electro-optical device 100 according to a third embodiment of the invention. The basic configuration of this embodiment is generally the same as that of the first embodiment, and therefore the same constituents will be given the same numeral and the description thereof will not be repeated. The following description will focus on a region in the vicinity of the side face 20g of the second substrate 20.

In the foregoing embodiments the plurality of second particles 72 in the second seal member 70 have the same diameter, however in this embodiment the second particles 72a, 72b of different diameters are employed as shown in FIG. 4. Between the second particles 72a and 72b, the second particles 72a are smaller in diameter than the second particles 72b, and the diameters of both of the second particles 72a and 72b are larger than the diameters of the first particles 71, the spacer 60a, and the height of the gap 107 between the first substrate 10 and the second substrate 20. Further, while at least a part of the second particles 72a is located between the sloped surface 20i of the second substrate 20 and the first surface 10s of the first substrate 10, the second particles 72b are located in the region on the outer side of the position between the sloped surface 20i of the second substrate 20 and the first surface 10s of the first substrate 10.

Such a configuration also enables, as the configuration according to the first and the second embodiment, the second particles 72 (72a, 72b) to prevent intrusion of moisture into the gap 107 between the first substrate 10 and the second substrate 20, thereby effectively preventing intrusion of moisture into the internal region of the first seal member 60.

Fourth Embodiment

Figure 5:
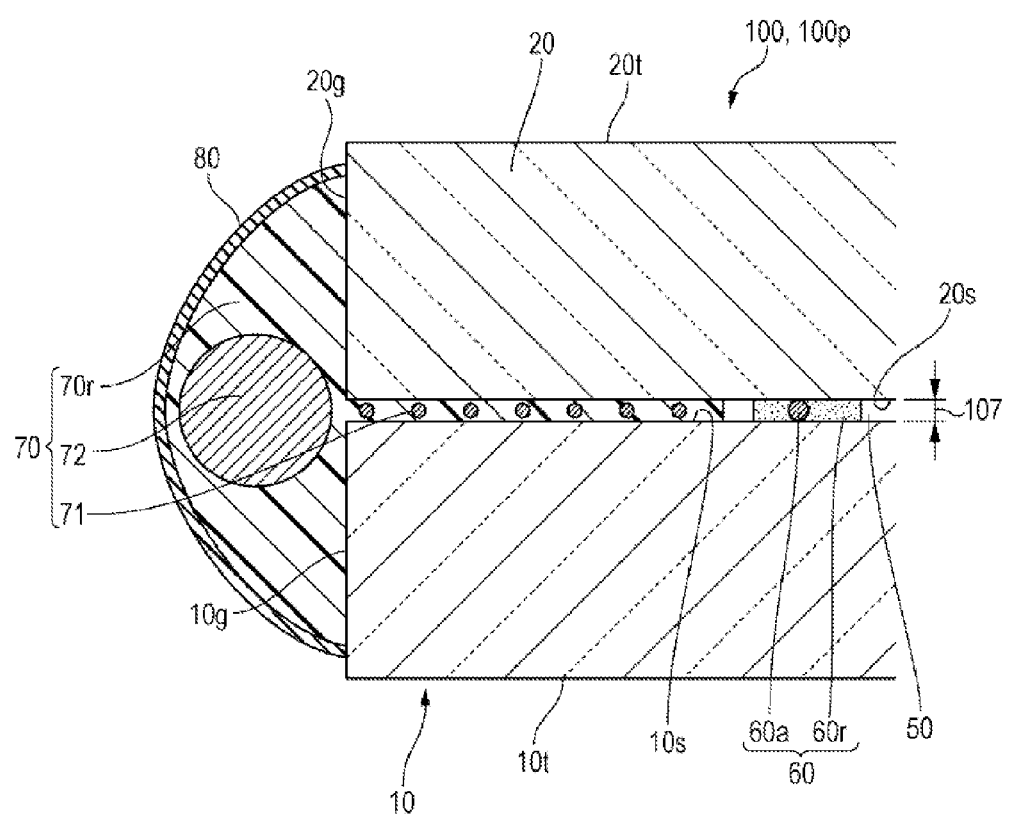
FIG. 5 is a schematic cross-sectional view of a second seal member provided in an electro-optical device according to a fourth embodiment of the invention.

FIG. 5 is a schematic cross-sectional view of the second seal member 70 provided in the electro-optical device 100 according to a fourth embodiment of the invention. The basic configuration of this embodiment is generally the same as that of the first embodiment, and therefore the same constituents will be given the same numeral and the description thereof will not be repeated. The following description will focus on a region in the vicinity of the side face 20g of the second substrate 20.

In the first to the third embodiments, the side face 20g of the second substrate 20 is located on the inner side of the side face 10g of the first substrate 10 in a plan view. Alternatively, the side face 20g of the second substrate 20 may overlap the side face 10g of the first substrate 10 in a plan view, as shown in FIG. 5. In this case, the second seal member 70 is formed so as to span over the side face 10g of the first substrate 10 and the side face 20g of the second substrate 20. This also applies to the side faces 20f, 20h (see FIG. 1A) of the second substrate 20.

With such a configuration also, the electro-optical material 50 is doubly sealed with the first seal member 60 and the second seal member 70, and the surface of the second seal member 70 is covered with the inorganic layer 80. Therefore, degradation of the electro-optical material 50 due to moisture can be effectively prevented, as with the configuration according to the first embodiment.

Additional Embodiments

In the foregoing embodiments, the electro-optical material 50 is introduced into the electro-optical device 100 through the liquid crystal inlet 60c of the first seal member 60. Alternatively, the first seal member 60 may be applied to the first substrate 10 in a frame shape without the disconnected portion, and the second substrate 20 may be bonded with the first substrate 10 via the first seal member 60, after dripping the electro-optical material 50 onto the region inside of the first seal member 60. The invention is also applicable to the electro-optical device 100 thus-configured.

In the foregoing embodiments, the first particles 71 smaller in diameter than the spacer 60a in the first seal member 60 are employed as particles to be provided in the gap 107 between the first substrate 10 and the second substrate 20. However, there are cases where a recessed groove is formed in the region where the first seal member 60 is to be provided, on either or both of the first substrate 10 and second substrate 20. In such a case, the gap 107 between the first substrate 10 and the second substrate 20 can be made narrower despite employing the spacer 60a of a larger diameter formed with higher accuracy. Accordingly, the diameter of the first particles 71 may be larger than the gap 107 between the first substrate 10 and the second substrate 20, even though the first particles 71 are formed in a smaller diameter than the spacer 60a of the first seal member 60. Therefore, it is preferable to determine the diameter of the first particles 71 on the basis of the gap 107 between the first substrate 10 and the second substrate 20, rather than the diameter of the spacer 60a.

Although the electro-optical device is exemplified by the liquid crystal device in the foregoing embodiments, the invention is broadly applicable to different electro-optical devices such as an organic electroluminescence display device, a plasma display device, a field emission display (FED), a surface-conduction electron-emitter display (SED), a light emitting diode (LED) display device, and an electrophoretic display device.

Configuration of Projection Display Device and Optical Unit

Figure 6:
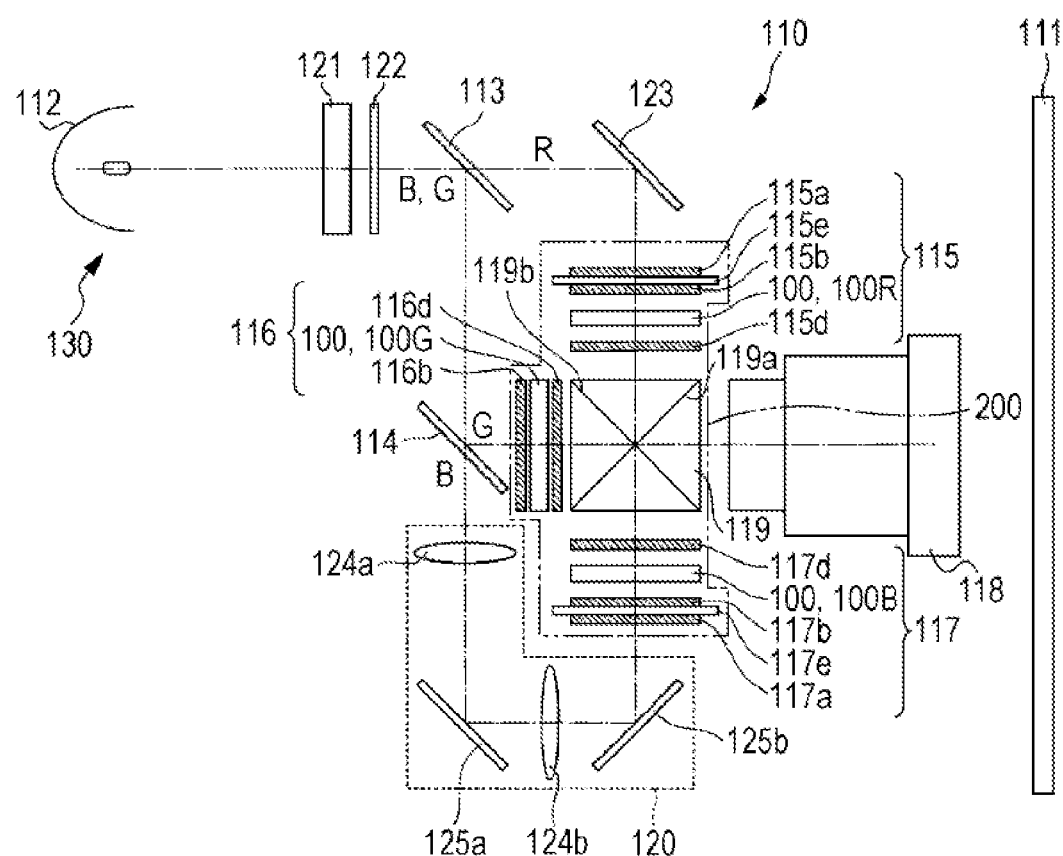
FIG. 6 is a schematic diagram showing a general configuration of a projection display device (electronic apparatus) and an optical unit to which the invention is applied.

FIG. 6 is a schematic diagram showing a general configuration of a projection display device (electronic apparatus) and an optical unit to which the invention is applied.

The projection display device 110 shown in FIG. 6 is what is known as a projector, configured to emit light onto a screen 111 provided on the side of a viewer, so that the view observes the light reflected by the screen 111. The projection display device 110 includes a light source unit 130 having a light source 112, dichroic mirrors 113, 114, liquid crystal light bulbs 115 to 117, a projecting optical system 118, a cross dichroic prism 119 (synthesizing optical system), and a relay system 120, and the electro-optical device 100 and the cross dichroic prism 119 constitute an optical unit 200.

The light source 112 is constituted of an ultra-high pressure mercury lamp that emits light including red light R, green light G, and blue light B. The dichroic mirror 113 transmits the red light R from the light source 112, but reflects the green light G and the blue light B. The dichroic mirror 114 transmits the blue light B reflected by the dichroic mirror 113, but reflects the green light G reflected by the dichroic mirror 113. Accordingly, the dichroic mirrors 113, 114 constitute a color-splitting optical system that splits the light emitted by the light source 112 into the red light R, the green light G, and the blue light B.

Between the light source 112 and the dichroic mirror 113, an integrator 121 and a polarizing converter 122 are provided in this order from the light source 112. The integrator 121 serves to equalize the luminance distribution of the light emitted by the light source 112. The polarizing converter 122 serves to turn the light from the light source 112 into polarized light having a specific oscillation direction, such as s-polarized light.

The liquid crystal light bulb 115 is a transmissive liquid crystal device that modulates the red light transmitted through the dichroic mirror 113 and reflected by the reflection mirror 123, according to an image signal. The liquid crystal light bulb 115 includes a $\lambda/2$ retardation plate 115a, a first polarizing plate 115b, an electro-optical device 100 (liquid crystal panel for red 100R), and a second polarizing plate 115d. The red light R incident on the liquid crystal light bulb 115 remains s-polarized, since the polarization state is not changed by the dichroic mirror 113.

The $\lambda/2$ retardation plate 115a is an optical element that converts the s-polarized light incident on the liquid crystal light bulb 115 into p-polarized light. The first polarizing plate 115b blocks the s-polarized light and transmits the p-polarized light. The electro-optical device 100 (liquid crystal panel for red 100R) converts the p-polarized light into the s-polarized light (circular polarization or elliptical polarization in the case of a half tone) by modulation based on the image signal. The second polarizing plate 115d blocks the p-polarized light and transmits the s-polarized light. Thus, the liquid crystal light bulb 115 serves to modulate the red light R according to the image signal, and to output the modulated red light R to the cross dichroic prism 119.

The $\lambda/2$ retardation plate 115a and the first polarizing plate 115b are attached to the respective surfaces of a glass plate 115e that transmits light without changing the polarization state, and therefore prevented from being distorted by heat.

The liquid crystal light bulb 116 is a transmissive liquid crystal device that converts the green light G reflected by the dichroic mirror 113 and then reflected by the dichroic mirror 114, according to the image signal. The liquid crystal light bulb 116 includes, like the liquid crystal light bulb 115, a first polarizing plate 116b, an electro-optical device 100 (liquid crystal panel for green 100G), and a second polarizing plate 116d. The green light G incident on the liquid crystal light bulb 116 after being reflected by the dichroic mirrors 113, 114 is still s-polarized. The first polarizing plate 116b blocks the p-polarized light and transmits the s-polarized light. The electro-optical device 100 (liquid crystal panel for green 100G) converts the s-polarized light into the p-polarized light (circular polarization or elliptical polarization in the case of a half tone) by modulation based on the image signal. The second polarizing plate 116d blocks the s-polarized light and transmits the p-polarized light. Thus, the liquid crystal light bulb 116 serves to modulate the green light G according to the image signal, and to output the modulated green light G to the cross dichroic prism 119.

The liquid crystal light bulb 117 is a transmissive liquid crystal device that converts the blue light B reflected by the dichroic mirror 113 and transmitted through the dichroic mirror 114 and the relay system 120, according to the image signal. The liquid crystal light bulb 117 includes, like the liquid crystal light bulbs 115 and 116, a λ/2 retardation plate 117a, a first polarizing plate 117b, an electro-optical device 100 (liquid crystal panel for blue 100B), and a second polarizing plate 117d. The blue light B is reflected by the dichroic mirror 113 and transmitted through the dichroic mirror 114, and then reflected by a pair of reflection mirrors 125a, 125b of the relay system 120 (described later) before reaching the liquid crystal light bulb 117, and therefore the blue light B incident thereon remains s-polarized.

The λ/2 retardation plate 117a is an optical element that converts the s-polarized light incident on the liquid crystal light bulb 117 into p-polarized light. The first polarizing plate 117b blocks the s-polarized light and transmits the p-polarized light. The electro-optical device 100 (liquid crystal panel for blue 100B) converts the p-polarized light into the s-polarized light (circular polarization or elliptical polarization in the case of a half tone) by modulation based on the image signal. The second polarizing plate 117d blocks the p-polarized light and transmits the s-polarized light. Thus, the liquid crystal light bulb 117 serves to modulate the blue light B according to the image signal, and to output the modulated blue light B to the cross dichroic prism 119. In addition, the λ/2 retardation plate 117a and the first polarizing plate 117b attached to the respective surfaces of a glass plate 117e.

The relay system 120 includes relay lenses 124a, 124b and the reflection mirrors 125a, 125b. The relay lenses 124a, 124b serve to minimize an optical loss of the blue light B because the optical path of the blue light B is longer. The relay lens 124a is located between the dichroic mirror 114 and the reflection mirror 125a. Likewise, the relay lens 124b is located between the reflection mirrors 125a, 125b. The reflection mirror 125a is oriented so as to reflect the blue light B, transmitted through the dichroic mirror 114 and outputted from the relay lens 124a, toward the relay lens 124b. The reflection mirror 125b is oriented so as to reflect the blue light B outputted from the relay lens 124b, toward the liquid crystal light bulb 117.

The cross dichroic prism 119 is a color-synthesizing optical system including a pair of dichroic films 119a, 119b orthogonally intersecting each other in a cross shape. The dichroic film 119a reflects the blue light B and transmits the green light G, and the dichroic film 119b reflects the red light R and transmits the green light G. Accordingly, the cross dichroic prism 119 serves to synthesize the red light R, the green light G, and the blue light B respectively modulated by the liquid crystal light bulbs 115 to 117, and to output the synthesized light to the projecting optical system 118.

Here, the light incident on the cross dichroic prism 119 from the liquid crystal light bulbs 115, 117 is s-polarized, while the light incident on the cross dichroic prism 119 from the liquid crystal light bulb 116 is p-polarized. Providing thus the light of different polarization states to the cross dichroic prism 119 enables the cross dichroic prism 119 to synthesize the light incident thereon from the liquid crystal light bulbs 115 to 117. In general, dichroic films have excellent reflection transistor characteristics with respect to the s-polarized light. It is for such a reason that the red light R and the blue light B reflected by the dichroic films 119a, 119b are s-polarized and the green light G transmitted through the dichroic films 119a, 119b is p-polarized. The projecting optical system 118 includes a non-illustrated projection lens and is configured to project the light synthesized by the cross dichroic prism 119 onto the screen 111.

Although the transmissive electro-optical device 100 is employed in the projection display device 110, a reflective electro-optical device may be employed to constitute the projection display device 110. Further, the light source unit 130 of the projection display device 110 may include LEDs that emit light of different colors, and the color lights emitted from the LEDs may each be provided to the corresponding liquid crystal device.

The electro-optical device 100 to which the invention is applied may be employed, other than the foregoing electronic apparatus, in a direct-view display device of electronic apparatuses such as a mobile phone, a personal digital assistant (PDA), a digital camera, a liquid crystal TV set, a car navigation system, a TV phone, a POS terminal, and an apparatus having a touch panel.

The entire disclosure of Japanese Patent Application No. 2013-014037, filed Jan. 29, 2013 is expressly incorporated by reference herein.

What is claimed is:

1. An electro-optical device comprising:
   a first substrate;
   a second substrate opposed to the first substrate;
   an electro-optical material retained between the first substrate and the second substrate;
   a first seal member combining the first substrate and the second substrate together and sealing the electro-optical material; and
   a second seal member formed along an outer periphery of the first seal member and containing a plurality of first particles and a plurality of second particles larger in diameter than the first particles,
   wherein the first particles are located between the first substrate and the second substrate, and the second particles are located on an outer side of the region where the first particles are located.

2. The electro-optical device according to claim 1, further comprising an inorganic layer covering an exposed surface of the second seal member.

3. The electro-optical device according to claim 1,
   wherein a side face of the second substrate is located on an inner side of a side face of the first substrate in a plan view,
   the second substrate includes a sloped surface formed between the side face of the second substrate and a face of the second substrate opposing the first substrate, the sloped surface being inclined with respect to a face of the first substrate opposing the second substrate, and
   at least a part of at least one of the plurality of second particles is located between the sloped surface and the face of the first substrate opposing the second substrate, at a position overlapping the sloped surface in a plan view.

4. The electro-optical device according to claim 1,
   wherein the first seal member includes a spacer that defines a clearance between the first substrate and the second substrate, and
   the first particles are smaller in diameter than the spacer.

5. The electro-optical device according to claim 1,
wherein a mass percentage of the first particles in the second seal member is larger than a mass percentage of the second particles in the second seal member.

6. An electronic apparatus comprising the electro-optical device according to claim 1.

* * * * *